United States Patent
Lu et al.

(10) Patent No.: US 12,140,844 B2
(45) Date of Patent: Nov. 12, 2024

(54) DISPLAY DEVICE

(71) Applicant: Innolux Corporation, Miao-Li County (TW)

(72) Inventors: You-Cheng Lu, Miao-Li County (TW); Chia-Hao Tsai, Miao-Li County (TW); Ming-Jou Tai, Miao-Li County (TW); Yi-Shiuan Cherng, Miao-Li County (TW); Yung-Hsun Wu, Miao-Li County (TW)

(73) Assignee: Innolux Corporation, Miao-Li County (TW)

( * ) Notice: Subject to any disclaimer, the term of this patent is extended or adjusted under 35 U.S.C. 154(b) by 0 days.

(21) Appl. No.: 18/307,799

(22) Filed: Apr. 27, 2023

(65) Prior Publication Data

US 2023/0400741 A1 Dec. 14, 2023

Related U.S. Application Data

(63) Continuation of application No. 17/711,053, filed on Apr. 1, 2022, now Pat. No. 11,698,559.

(30) Foreign Application Priority Data

Apr. 29, 2021 (CN) .......................... 202110474326.8

(51) Int. Cl.
*G02F 1/1362* (2006.01)
(52) U.S. Cl.
CPC .. *G02F 1/136286* (2013.01); *G02F 1/136209* (2013.01)
(58) Field of Classification Search
None
See application file for complete search history.

(56) References Cited

U.S. PATENT DOCUMENTS 8,587,754 B2 * 11/2013 Jeong .................... G02F 1/1368
349/114
2022/0173195 A1 * 6/2022 Liu .................... G02F 1/136286

FOREIGN PATENT DOCUMENTS

| CN | 112102727 | 12/2020 |
| CN | 112445038 | 3/2021 |

OTHER PUBLICATIONS

"Office Action of China Counterpart Application", issued on Feb. 28, 2024, p. 1-p. 8.

* cited by examiner

*Primary Examiner* — Richard H Kim
(74) *Attorney, Agent, or Firm* — JCIPRNET

(57) ABSTRACT

A display device having a first region, a second region, and a third region set between the first region and the second region is provided. The display device includes a first sub-pixel, a second sub-pixel, and a first signal line. The first sub-pixel is arranged in the first region. The second sub-pixel is arranged in the second region, the area of the first sub-pixel is larger than the area of the second sub-pixel. The first signal line is arranged in the first region and the third region, and is electrically connected to the first sub-pixel and the second sub-pixel. At least a part of the first signal line extends in the first direction in the first region. At least another part of the first signal line extends in the second direction in the third region. The first direction is different from the second direction.

10 Claims, 9 Drawing Sheets

DISPLAY DEVICE

CROSS-REFERENCE TO RELATED APPLICATION

This application is a continuation application of and claims the priority benefit of U.S. patent application Ser. No. 17/711,053, filed on Apr. 1, 2022, which claims the priority benefit of China patent application serial no. 202110474326.8, filed on Apr. 29, 2021. The entirety of each of the above-mentioned patent applications is hereby incorporated by reference herein and made a part of this specification.

BACKGROUND

Field of the Disclosure

The disclosure relates to an electronic device, and more particularly to a display device.

Description of Related Art

Compared with opening holes on the display panel to accommodate a camera module, arranging the camera module under the display panel can effectively reduce the frame or help increase the size of the display region. However, when connecting the pixels in the general display region and the display region provided with the camera module, the pixels may have a wrong voltage, or the design of the wire connecting the pixels in the above two regions may affect the display quality.

SUMMARY OF THE DISCLOSURE

The disclosure provides a display device, which helps reduce the effect of diffraction or improve the display quality.

According to an embodiment of the disclosure, the display device has a first region, a second region, and a third region disposed between the first region and the second region. The display device includes a first sub-pixel, a second sub-pixel, and a first signal line. The first sub-pixel is arranged in the first region. The second sub-pixel is arranged in the second region, and the area of the first sub-pixel is larger than the area of the second sub-pixel. The first signal line is disposed in the first region and the third region, and is electrically connected to the first sub-pixel and the second sub-pixel. At least a part of the first signal line extends in the first direction in the first region. At least another part of the first signal line extends in the second direction in the third region. The first direction is different from the second direction.

According to an embodiment of the disclosure, the display device has a first region, a second region, and a third region arranged between the first region and the second region. The display device includes multiple first sub-pixels, multiple second sub-pixels, and multiple first signal lines. Multiple first sub-pixels are arranged in the first region. Multiple second sub-pixels are arranged in the second region, and the area of one of multiple first sub-pixels is larger than the area of one of multiple second sub-pixels. Multiple first signal lines are arranged in the third region and are electrically connected to multiple first sub-pixels and multiple second sub-pixels. In the third region, the length of one of multiple first signal lines is different from the length of another one of multiple first signal lines.

In order to make the above-mentioned features and advantages of the disclosure more obvious and comprehensible, the embodiments are described below with reference to the accompanying drawings for detailed description as follows.

BRIEF DESCRIPTION OF THE DRAWINGS

The accompanying drawings are included to provide a further understanding of the disclosure, and are incorporated in and constitute a part of this specification. The drawings illustrate the disclosure and, together with the description, serve to explain the principles of the disclosure.

DESCRIPTION OF EMBODIMENTS

Figure 1A:
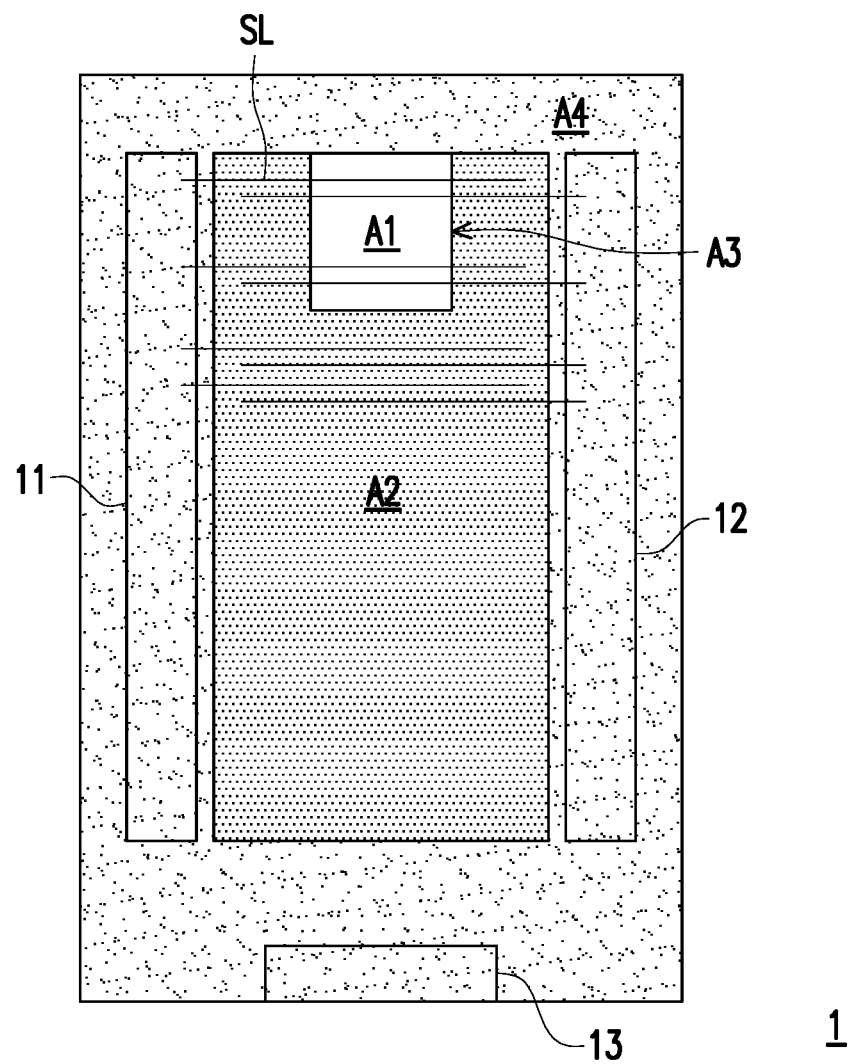
FIG. 1A and FIG. 1B are respectively a schematic top view and a partially enlarged schematic view of a display device according to the first embodiment of the disclosure.

The disclosure can be understood by referring to the following detailed description in combination with the accompanying drawings. It should be noted that in order to make it easy for the reader to understand and for the simplicity of the drawings, the multiple drawings in this disclosure only depict a part of the electronic device/display device, and the specific components in the drawings are not drawn according to actual scale. In addition, the number and size of each component in the drawings are only for exemplary purpose, and are not intended to limit the scope of the disclosure. For example, for clarity, the relative size, thickness, and position of each layer, region, or structure may be reduced or enlarged.

Throughout the disclosure and the appended claims, certain words are used to refer to specific components. Those skilled in the art should understand that electronic device manufacturers may refer to the same components by different names. The disclosure does not intend to distinguish those components with the same function but different names. In the following description and claims, the terms "contain" and "include" are open-ended terms, so they should be interpreted as "include but not limited to . . . ".

Directional terms mentioned in this text, such as "upper", "lower", "front", "rear", "left", "right", etc., are only directions with reference to the drawings. Therefore, the directional terms used are used to illustrate, but not to limit the disclosure. It should be understood that when an element or film is referred to as being "on" or "connected" to another element or film, the element or film may be directly on the other element or film or directly connected to the other element or film, or there is an intervening element or film between the two (indirectly). Conversely, when an element or film is said to be "directly" on or "directly connected" to another element or film, there is no intervening element or film between the two.

The terms "about", "equal to", "equivalent to" or "same", "substantially" or "approximately" used in the text are generally interpreted as being within 10% of a given value or range, or interpreted as being within 5%, 3%, 2%, 1%, or 0.5% of a given value or range. In addition, the descriptions "the given range is from the first numerical value to the second numerical value" and "the given range falls within a range from the first numerical value to the second numerical value" mean that the given range includes the first numerical value, the second numerical value, and other numerical values between the two.

In some embodiments of the disclosure, terms such as "connected", "interconnected", etc., about joining and connecting, unless specifically defined, can mean that two structures are in direct contact, or that two structures are not directly in contact, where there are other structures located between the two structures. The terms of joining and connecting may also include the case where both structures are movable or both structures are fixed. In addition, the terms "electrical connection" and "coupling" include any direct and indirect electrical connection means.

In the following embodiments, the same or similar elements will use the same or similar reference numerals, and redundant descriptions thereof will be omitted. In addition, the features in different embodiments can be mixed and matched freely as long as they do not violate the spirit of the disclosure or in conflict with each other, and simple equivalent changes and modifications made in accordance with this specification or claims are still within the scope of this disclosure. In addition, the terms "first" and "second" mentioned in this specification or claims are only used to name different elements or distinguish different embodiments or ranges, and are not used to restrict the upper or lower limit of the number of components. It is not used to limit the manufacturing order or the arrangement order of the components.

The electronic device of the disclosure may include a display device, an antenna device, a sensing device, a light-emitting device, a touch display device, a curved display device, or a free shape electronic device, but not limited thereto. The electronic device may include a bendable or flexible electronic device. The electronic device may include, for example, liquid crystal, light-emitting diode, quantum dot (QD), fluorescence, phosphor, other suitable display media, or a combination of the above materials, but not limited thereto. The light-emitting diode may include, for example, an organic light-emitting diode (OLED), a mini LED, a micro LED, or a quantum dot LED (which may include QLED, QDLED), or other suitable materials, or a combination of the above, but not limited thereto. The display device may include, for example, a tiled display device, but is not limited thereto. The antenna device may be, for example, a liquid crystal antenna, but is not limited thereto. The antenna device may include, for example, an antenna tiled device, but not limited thereto. It should be noted that the electronic device can be any combination of the foregoing, but is not limited thereto. In addition, the appearance of the electronic device may be rectangular, circular, polygonal, a shape with curved edges, or other suitable shapes. The electronic device may have peripheral systems such as a driving system, a control system, a light source system, etc., to support a display device, an antenna device, or a tiled device. Hereinafter, a display device will be used as an electronic device to illustrate the content of the disclosure, but the disclosure is not limited thereto.

The display device of the disclosure may be any kind of display device, such as a self-luminous display device or a non-self-luminous display device. The self-luminous display device may include a light-emitting diode, a light conversion layer or other suitable materials, or a combination of the above, but is not limited thereto. The LED may include, for example, an OLED, a mini LED, a micro LED, or a quantum dot LED (which may include QLED, QDLED), but not limited thereto. The light conversion layer may include a wavelength conversion material and/or a light filter material, and the light conversion layer may include, for example, fluorescence, phosphor, quantum dot (QD), other suitable materials, or a combination of the above, but not limited thereto. The non-self-luminous display device may include a liquid crystal display device, but is not limited thereto. Hereinafter, a display device will be used as an electronic device to illustrate the content of the disclosure, but the disclosure is not limited thereto.

Figure 1B:
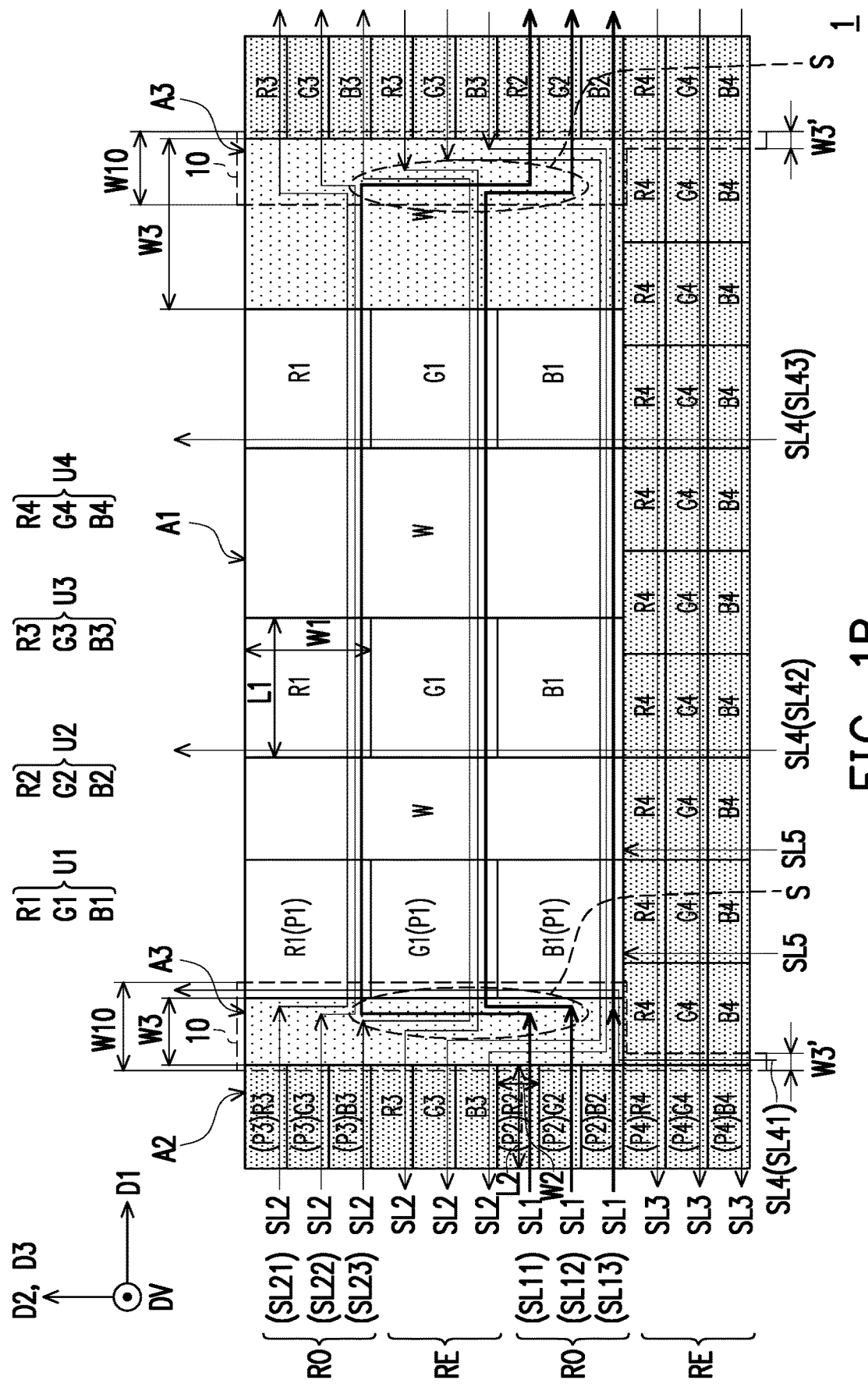

FIG. 1A and FIG. 1B are respectively a schematic top view and a partially enlarged schematic view of a display device according to the first embodiment of the disclosure. Please refer to FIG. 1A and FIG. 1B, the display device 1 has a first region A1, a second region A2, and a third region A3 arranged between the first region A1 and the second region A2, but not limited thereto. The display device 1 can increase or decrease one or multiple regions according to requirements. For example, the display device 1 may also have a fourth region A4 located around the second region A2. The fourth region A4 may be located on one or multiple sides of the second region A2. FIG. 1A schematically shows that the fourth region A4 surrounds the second region A2, but is not limited thereto. In FIG. 1A and FIG. 1B, to clearly distinguish multiple regions from each other, the background color of the fourth region A4 (please refer to FIG. 1A) is represented by irregularly arranged dots, and the background color of the third region A3 is represented by dots that are arranged regularly and sparsely (please refer to FIG. 1B), the background color of the second region A2 is represented by dots that are arranged regularly and densely, and the first region A1 is shown with no background color.

The first region A1 is, for example, a function display region. In addition to providing display functions, the first region A1 can also provide additional functions. For example, the sensing module (not shown) in the display device 1 can be disposed under the display panel (not shown) in the first region A1 to provide capturing, photographing, or biometric identification (such as fingerprint identification) and other functions, but not limited thereto. The second region A2 is, for example, a general display region, that is, the second region A2 provides a display function. The third region A3 is, for example, a wiring region or referred to as a circuit turning region S. By turning the circuit, the first region A1 can be written with the correct pixel voltage. The fourth region A4 is, for example, a peripheral region. The peripheral region can be used to set up lines or driving components, but not limited thereto. The first region, the second region, the third region, and the fourth region of the disclosure may each include all the stacks and films of the display device in the region in the top view direction, but the disclosure is not limited thereto.

Referring to FIG. 1A, the display device 1 may include a first driving circuit 11, a second driving circuit 12, and a third driving circuit 13. The first driving circuit 11, the second driving circuit 12, and the third driving circuit 13 are arranged in the fourth region A4. The first driving circuit 11 is arranged on one side of the second region A2, and the second driving circuit 12 is arranged on the other side of the second region A2 and is opposite to the first driving circuit 11. The third driving circuit 13 is arranged on one side where the second region A2 is adjacent to the first driving circuit 11 and the second driving circuit 12. In other embodiments, the driving circuit may be arranged in the second region A2, but the disclosure is not limited thereto.

The first driving circuit 11 and the second driving circuit 12 are, for example, gate driving circuits. The first driving circuit 11 and the second driving circuit 12 can provide gate signals to the pixels located in the first region A1 and the second region A2 through the signal line SL, but not limited thereto. The third driving circuit 13 includes, for example, an external pin bonding circuit, which can be used for bonding with an external circuit, but is not limited thereto.

Referring to FIG. 1B, the display device 1 may include a first sub-pixel P1, and the number of the first sub-pixel P1 in the display device 1 may be multiple. Multiple first sub-pixels P1 are arranged in the first region A1 (refer to the region without background color in FIG. 1B). Multiple first sub-pixels P1 may include multiple first red sub-pixels R1, multiple first green sub-pixels G1, and multiple first blue sub-pixels B1, but not limited thereto. The stacked structure of each colored sub-pixel in the normal direction DV of the display device 1 may include a pixel electrode on the active device array substrate side and a filter pattern on the color filter substrate side, but is not limited thereto. The active device array substrate and the color filter substrate are known components of the display panel, so no further description will be incorporated here.

In the first region A1 (refer to the region without background color in FIG. 1B), multiple first sub-pixels P1 of the same color (such as multiple first red sub-pixels R1, multiple first green sub-pixels G1, or multiple first blue sub-pixels B1) can be arranged in the first direction D1, and multiple first sub-pixels P1 of different colors can be alternately arranged in the second direction D2, but is not limited thereto. Each first green sub-pixel G1 may form a first pixel unit (or referred to as a first pixel) U1 with a first red sub-pixel R1 and a first blue sub-pixel B1 that are adjacent in the second direction D2. In some embodiments, the display device 1 may further include multiple white sub-pixels W. Multiple white sub-pixels W can be arranged in the first region A1 and/or the third region A3 (refer to the region with dots that are arranged regularly and densely in FIG. 1B). In the first region A1, each white sub-pixel W can be arranged between two first pixel units U1 that are adjacent in the first direction D1, but is not limited thereto. Although not shown, the stacked structure of the white sub-pixel W in the normal direction DV of the display device 1 may include a pixel electrode on the active device array substrate side, and the white sub-pixel W may be electrically connected to an additional signal line (not shown), but not limited thereto. When the display device 1 is in the display mode, the white sub-pixel W can be turned off (make the white sub-pixel W appear in a dark state). When the display device 1 is in the camera mode (or sensing mode), the white sub-pixel W can be illuminated (make the white sub-pixel W appear bright) to increase the overall brightness so that the camera module located in the first region A1 can obtain the image of the target object.

The display device 1 may further include a second sub-pixel P2, and the number of the second sub-pixel P2 in the display device 1 may be multiple. Multiple second sub-pixels P2 are arranged in the second region A2 (refer to the region with dots that are arranged regularly and densely in FIG. 1B). Multiple second sub-pixels P2 may include multiple second red sub-pixels R2, multiple second green sub-pixels G2, and multiple second blue sub-pixels B2, but not limited thereto. The stacked structure of each colored sub-pixel in the normal direction DV of the display device 1 may include a pixel electrode on the active device array substrate side and a filter pattern on the color filter substrate side, but is not limited thereto.

In the second region A2 (refer to the region with dots that are arranged regularly and densely in FIG. 1B), the multiple second sub-pixels P2 of the same color (such as multiple second red sub-pixels R2, multiple second green sub-pixels G2, or multiple second blue sub-pixels B2) can be arranged in the first direction D1, and multiple second sub-pixels P2 of different colors can be alternately arranged in the second direction D2, but is not limited thereto. Each second green sub-pixel G2 may form a second pixel unit (or referred to as a second pixel) U2 with a second red sub-pixel R2 and a second blue sub-pixel B2 adjacent in the second direction D2.

In some embodiments, by making the resolution of the first region A1 (refer to the region without background color in FIG. 1B) lower than the resolution of the second region A2 (refer to the region with dots that are arranged regularly and densely in FIG. 1B), it is possible to reduce the diffraction that affects the camera module set in the first region A1, thereby improving the imaging quality of the camera module. The method of making the resolution of the first region A1 lower than the resolution of the second region A2 may include making the area of one of multiple first sub-pixels P1 larger than the area of one of multiple second sub-pixels P2. In some embodiments, as shown in FIG. 1B, the area of each first sub-pixel P1 may be larger than the area of each second sub-pixel P2. For example, the area of the first red sub-pixel R1 may be larger than the area of the second red sub-pixel R2, the area of the first green sub-pixel G1 may be larger than the area of the second green sub-pixel G2, and the area of the first blue sub-pixel B1 may be larger than the area of the second blue sub-pixel B2. In some embodiments, the area of the sub-pixel described in the disclosure can be defined, for example, by the area of the pixel electrode of the sub-pixel, or defined by the size of the opening of the black matrix layer disposed on the pixel electrode, but the disclosure is not limited thereto. For example, please refer to FIG. 1B. Assuming that the frame range of each sub-pixel in FIG. 1B is the range enclosed by the black matrix, then the area of the sub-pixel is substantially equal to the maximum length of the opening along the first direction D1 multiplied by the maximum width along the second direction D2, that is, the first red sub-pixel R1 has a first length (or maximum length) L1 and a first width (or maximum width) W1, then the area of the first red sub-pixel R1 is substantially equal to the first length L1 multiplied by the first width W1. The second red sub-pixel R2 has a second length (or maximum length) L2 and a second width (or maximum width) W2, then the area of the second red sub-pixel R2 is substantially equal to the second length L2 multiplied by the second width W2. The area of other sub-pixels can be calculated according to the above definition, so no repetition is incorporated herein. In other embodiments, the first sub-pixel P1 and the second sub-pixel P2 may have the same length but different widths, or have the same width but different lengths, but the disclosure is not limited thereto.

The display device 1 may further include a first signal line SL1, and the number of the first signal line SL1 in the display device 1 may be multiple. Multiple first signal lines SL1 are arranged in the first region A1 (refer to the region without background color in FIG. 1B) and the third region A3 (refer to the region with dots that are arranged regularly and sparsely in FIG. 1B), and are electrically connected to multiple first sub-pixels P1 and multiple second sub-pixels P2. For example, multiple first signal lines SL1 are, for example, gate lines, and multiple first signal lines SL1, for example, extend into the first region A1 from the second region A2 through the third region A3 to provide gate signals to multiple first sub-pixels P1 in the first region A1 and multiple second sub-pixels P2 in the second region A2. Among multiple first signal lines SL1, as shown in FIG. 1B, the first signal line SL11 electrically connects, for example, multiple second red sub-pixels R2 located in the second region A2 and multiple first red sub-pixels R1 located in the first region A1. The first signal line SL12, for example, electrically connects multiple second green sub-pixels G2 in the second region A2 and multiple first green sub-pixels G1 in the first region A1. The first signal line SL13, for example, electrically connects multiple second blue sub-pixels B2 in the second region A2 and multiple first blue sub-pixels B1 in the first region A1.

In the third region A3 (refer to the region with dots that are arranged regularly and sparsely in FIG. 1B), multiple first signal lines SL1 are respectively connected between a first pixel unit U1 and a corresponding second pixel unit U2, to respectively electrically connect the first red sub-pixel R1 of the first pixel unit U1 and the second red sub-pixel R2 of the corresponding second pixel unit U2, electrically connect the first green sub-pixel G1 of the first pixel unit U1 and the second green sub-pixel G2 of the corresponding second pixel unit U2, and electrically connect the first blue sub-pixel B1 of the first pixel unit U1 and the second blue sub-pixel B2 of the corresponding second pixel unit U2. Through multiple first signal lines SL1 that electrically connect each of the second red sub-pixel R2, the second green sub-pixel G2, and the second blue sub-pixel B2 of the second pixel unit U2 with the first red sub-pixel R1, the first green sub-pixel G1 and the first blue sub-pixel B1 of the corresponding first pixel unit U1, the multiple first sub-pixels P1 in the first region A1 can be written with the correct voltage, so that the probability of abnormal images can be reduced and the display quality can be improved.

In the above wiring structure, in the third region A3 (refer to the region with dots that are arranged regularly and sparsely in FIG. 1B), the length of one of multiple first signal lines SL1 may be different from the length of another one of multiple first signal lines SL1. For example, in the third region A3, the length of the first signal line SL11 may be greater than the length of the first signal line SL12, and the length of the first signal line SL12 may be greater than the length of the first signal line SL13, but is not limited thereto. In addition, among multiple first signal lines SL1, at least one of the first signal lines SL1 has different extending directions in the first region A1 (refer to the region without background color in FIG. 1B) and the third region A3 (refer to the region with dots that are arranged regularly and sparsely in FIG. 1B). For example, at least a part of the first signal line SL11 (or first signal line SL12) extends along the first direction D1 in the first region A1, and at least another part of the first signal line SL11 extends along the second direction D2 in the third region A3. The first direction D1 is different from the second direction D2 and both are perpendicular to the normal direction DV. FIG. 1B schematically shows that the first direction D1 is perpendicular to the second direction D2, but is not limited thereto. In other embodiments, the angle between the first direction D1 and the second direction D2 may be greater than, equal to, or less than 90 degrees.

According to different requirements, the display device 1 may also include other components or layers. For example, the display device 1 may further include a third sub-pixel P3, and the number of the third sub-pixel P3 in the display device 1 may be multiple. Multiple third sub-pixels P3 are arranged in the second region A2 (refer to the region with dots that are arranged regularly and densely in FIG. 1B). Multiple third sub-pixels P3 may include multiple third red sub-pixels R3, multiple third green sub-pixels G3, and multiple third blue sub-pixels B3, but not limited thereto. The stacked structure of each colored sub-pixel in the normal direction DV of the display device 1 may include a pixel electrode on the active device array substrate side and a filter pattern on the color filter substrate side, but is not limited thereto.

In the second region A2 (refer to the region with dots that are arranged regularly and densely in FIG. 1B), the multiple third sub-pixels P3 of the same color (such as multiple third red sub-pixels R3, multiple third green sub-pixels G3 or multiple third blue sub-pixels B3) can be arranged in the first direction D1, and multiple second sub-pixels P2 of different colors can be alternately arranged in the second direction D2, but it is not limited thereto. Each third green sub-pixel G3 may form a third pixel unit (or referred to as a third pixel) U3 with a third red sub-pixel R3 and a third blue sub-pixel B3 that are adjacent in the second direction D2. In addition, the area of one of multiple third sub-pixels P3 may be equal to the area of one of multiple second sub-pixels P2. In some embodiments, the area of each third sub-pixel P3 may be equal to the area of each second sub-pixel P2.

The display device 1 may further include a second signal line SL2, and the number of the second signal line SL2 in the display device 1 may be multiple. Multiple second signal lines SL2 are electrically connected to multiple third sub-pixels P3, and multiple second signal lines SL2 are electrically insulated from multiple first sub-pixels P1 and pass through multiple first sub-pixels P1. For example, multiple second signal lines SL2 are, for example, gate lines, and multiple second signal lines SL2 can be disposed in the first region A1 (refer to the region without background color in FIG. 1B) and the third region A3 (refer to the region with dots that are arranged regularly and sparsely in FIB. 1B). As shown in FIG. 1B, multiple second signal lines SL2 can extend through the first region A1 and the third region A3 located on two opposite sides of the first region A1, and electrically connect multiple third sub-pixels P3 that are arranged in the first direction D1 in the second region A2 (refer to the region with dots that are arranged regularly and densely in FIG. 1B) located on two opposite sides of the first region A1. Among multiple second signal lines SL2, as shown in FIG. 1B, the second signal line SL21, for example, electrically connects multiple third red sub-pixels R3 arranged in the first direction D1 in the second region A2, and the second signal line SL22, for example, electrically connects multiple third green sub-pixels G3 arranged in the first direction D1 in the second region A2, and the second signal line SL23, for example, electrically connects multiple third blue sub-pixels B3 arranged in the first direction D1 in the second region A2.

In the above wiring structure, in the third region A3 (refer to the region with dots that are arranged regularly and sparsely in FIG. 1B), the length of one of multiple second signal lines SL2 may be different from the length of another one of multiple second signal lines SL2. For example, in the third region A3, the length of the second signal line SL23 may be greater than the length of the second signal line SL21, and the length of the second signal line SL21 may be greater than the length of the second signal line SL22, but not limited thereto. In other embodiments, the length of the second signal line SL21 can also be greater than the length of the second signal line SL22, and the length of the second signal line SL22 can also be greater than the length of the second signal line SL23, the lengths of the second signal lines SL21 to SL22 may be the same or different depending on actual design requirements, but the disclosure is not limited thereto. In addition, among multiple second signal lines SL2, at least one of the second signal lines SL2 has different extending directions in the first region A1 (refer to the region without background color in FIG. 1B) and the third region A3 (refer to the region with dots that are arranged regularly and sparsely in FIG. 1B). For example, at least a part of the second signal line SL21 (or the second signal line SL22, or the second signal line SL23) extends along the first direction D1 in the first region A1, and at least another part of the second signal line SL21 (or the second signal line SL22 or the second signal line SL23) extends in the third direction D3 in the third region A3. The first direction D1 is different from the third direction D3 and both are perpendicular to the normal direction DV. FIG. 1B schematically shows that the first direction D1 is perpendicular to the third direction D3, and the third direction D3 is the same direction as the second direction D2, but it is not limited thereto. In other embodiments, the angle between the first direction D1 and the third direction D3 may be greater than, equal to, or less than 90 degrees.

The display device 1 may further include a fourth sub-pixel P4, and the number of the fourth sub-pixel P4 in the display device 1 may be multiple. Multiple fourth sub-pixels P4 are arranged in the second region A2 (refer to the region with dots that are arranged regularly and densely in FIG. 1B). Multiple fourth sub-pixels P4 may include multiple fourth red sub-pixels R4, multiple fourth green sub-pixels G4, and multiple fourth blue sub-pixels B4, but not limited thereto. The stacked structure of each colored sub-pixel in the normal direction DV of the display device 1 may include a pixel electrode on the active device array substrate side and a filter pattern on the color filter substrate side, but is not limited thereto.

In the second region A2 (refer to the region with dots that are arranged regularly and densely in FIG. 1B), multiple fourth sub-pixels P4 of the same color (such as multiple fourth red sub-pixels R4, multiple fourth green sub-pixels G4 or multiple fourth blue sub-pixels B4) can be arranged in the first direction D1, and the multiple fourth sub-pixels P4 of different colors can be alternately arranged in the second direction D2, but is not limited thereto. Each fourth green sub-pixel G4 may form a fourth pixel unit (or referred to as a fourth pixel) U4 with a fourth red sub-pixel R4 and a fourth blue sub-pixel B4 that are adjacent in the second direction D2. In addition, the area of one of the multiple fourth sub-pixels P4 may be equal to the area of one of the multiple second sub-pixels P2. In some embodiments, the area of each fourth sub-pixel P4 may be equal to the area of each second sub-pixel P2.

The display device 1 may further include a third signal line SL3, and the number of the third signal line SL3 in the display device 1 may be multiple. Multiple third signal lines SL3 are electrically connected to multiple fourth sub-pixels P4. For example, multiple third signal lines SL3 are, for example, gate lines, and multiple third signal lines SL3 may be disposed in the second region A2 (refer to the region with dots that are arranged regularly and densely in FIG. 1B). As shown in FIG. 1B, multiple third signal lines SL3 may extend through the second region A2, and multiple third signal lines SL3 are not overlapped with the first region A1 (see the region without the background color in FIG. 1B) and the third region A3 (see the region with dots that are arranged regularly and sparsely in FIG. 1B) in the normal direction DV. Among multiple third signal lines SL3, as shown in FIG. 1B, the third signal line SL31, for example, electrically connects multiple fourth red sub-pixels R4 arranged in the first direction D1 in the second region A2, and the third signal line SL32, for example, electrically connects multiple fourth green sub-pixels G4 arranged in the first direction D1 in the second region A2, and the third signal line SL33, for example, electrically connects multiple fourth blue sub-pixels B4 arranged in the first direction D1 in the second region A2.

The display device 1 may further include a fourth signal line SL4 and a fifth signal line SL5, and the number of the fourth signal line SL4 and the fifth signal line SL5 in the display device 1 may be multiple. Multiple fourth signal lines SL4 are electrically connected to multiple sub-pixels arranged in the second direction D2. For example, multiple fourth signal lines SL4 and multiple fifth signal lines SL5 are, for example, data lines, and multiple fourth signal lines SL4 (such as the fourth signal line SL41, the fourth signal line SL42, and the fourth signal line SL43) can be arranged in the first region A1 (refer to the region without background color in FIG. 1B) and the second region A2 (refer to the region with dots that are arranged regularly and densely in FIG. 1B). The multiple fifth signal lines SL5 can be arranged in the second region A2 without passing through the first region A1. In some embodiments, multiple fifth signal lines SL5 are not electrically connected to the first sub-pixel P1 in the first region A1.

In this embodiment, as shown in FIG. 1B, the first region A1 (refer to the region without background color in FIG. 1B) is mainly composed of large-area sub-pixels, and the large-area sub-pixels may include the first sub-pixel P1. In some embodiments, a white sub-pixel W may also be arranged in the first region A1, and the white sub-pixel W may be arranged between two first pixel units U1 that are adjacent in the first direction D1. The second region A2 (refer to the region with dots that are arranged regularly and densely in FIG. 1B) is mainly composed of small-area sub-pixels, and the small-area sub-pixels may include the second sub-pixel P2, the third sub-pixel P3, and the fourth sub-pixel P4. The third region A3 (refer to the region with dots that are arranged regularly and sparsely in FIG. 1B) is located between the first region A1 and the second region A2. A width from the edge of the pixel electrode (not shown) of the second sub-pixel P2 in the second region A2 to the closest edge of the pixel electrode of the first sub-pixel P1 in the first region A1 in the first direction D1 is the width W3 of the third region A3. In some embodiments, the white sub-pixel W may be located in the third region A3 other than the first region A1. The display device 1 may further include a shielding component 10. The shielding component 10 can be arranged corresponding to the third region A3. For example, the shielding component 10 may at least partially overlap or completely overlap the third region A3 in the normal direction DV, so as to shield the line located in the third region A3. The width W10 of the shielding component 10 in the first direction D1 may be greater or less than the width W3 of the third region A3. In some embodiments, other than the third region A3, the shielding component 10 can further shield the first signal line SL1 or other signal lines outside the third region A3, such as shielding the first signal line SL1, the second signal line SL2 and the fourth signal line SL4 located in the first region A1, and shielding the first signal line SL1 to the fourth signal line SL4 located in the second region A2. The shielding component 10 may include a black matrix or other light-shielding or light-absorbing materials, but is not limited thereto. By arranging a part of the white sub-pixel Win the third region A3, it helps to reduce the area of circuit turning area S occupied in the area of the first sub-pixel P1 in the first region A1 and/or the second sub-pixel P2 in the second region A2, thereby helping to reduce the coverage area or width of the shielding component 10 in the region outside the third region A3. In this manner, the aperture ratio or light transmittance of the sub-pixels (for example, the first sub-pixel P1 or the second sub-pixel P2) in the region outside the third region A3 maintains unchanged. In some embodiments, the width W3' of the shielding component 10 in the second region A2 in the first direction D1 may be less than the width W3 of the shielding component 10 in the third region A3 in the first direction D1.

For ease of reading, FIG. 1B shows the first signal line SL1 with thick solid line, and shows the second signal line SL2, the third signal line SL3, and the fourth signal line SL4 with thin solid line. However, it should be understood that the line width of the first signal line SL1 may be the same or different from the line width of any one of the second signal line SL2, the third signal line SL3, and the fourth signal line SL4. In addition, the wiring method of the first signal line SL1 to the fourth signal line SL4 as well as the relative arrangement relationship between them and multiple sub-pixels, or the area or shape of each sub-pixel can be changed depending on requirements, and are not limited to the illustration shown in FIG. 1B. For example, although not shown, multiple second signal lines SL2 may not extend into the first region A1, but electrically connect multiple third sub-pixels P3 in the second region A2 located opposite to the first region A1 from one side of the first region A1 (for example, one side where the first region A1 is connected to the second region A2 or one side where first region A1 is not adjacent to the second region A2) or from multiple sides that detour the first region A1. In addition, although it is not shown, the second pixel unit U2 can also exchange positions with any third pixel unit U3 arranged in the second direction D2. Any embodiment of the disclosure can be changed in the same manner as described above, and no repetition will be incorporated below.

In FIG. 1B, the arrow to the right represents the gate signal from the first driving circuit 11 of FIG. 1A, and the arrow to the left represents the gate signal from the second driving circuit 12 of FIG. 1A. As shown in FIG. 1B, the gate signals of multiple pixel units on the odd number of rows RO and multiple pixel units on the even number of rows RE can be provided by the first driving circuit 11 and the second driving circuit 12 of FIG. 1A, respectively.

Figure 2A:
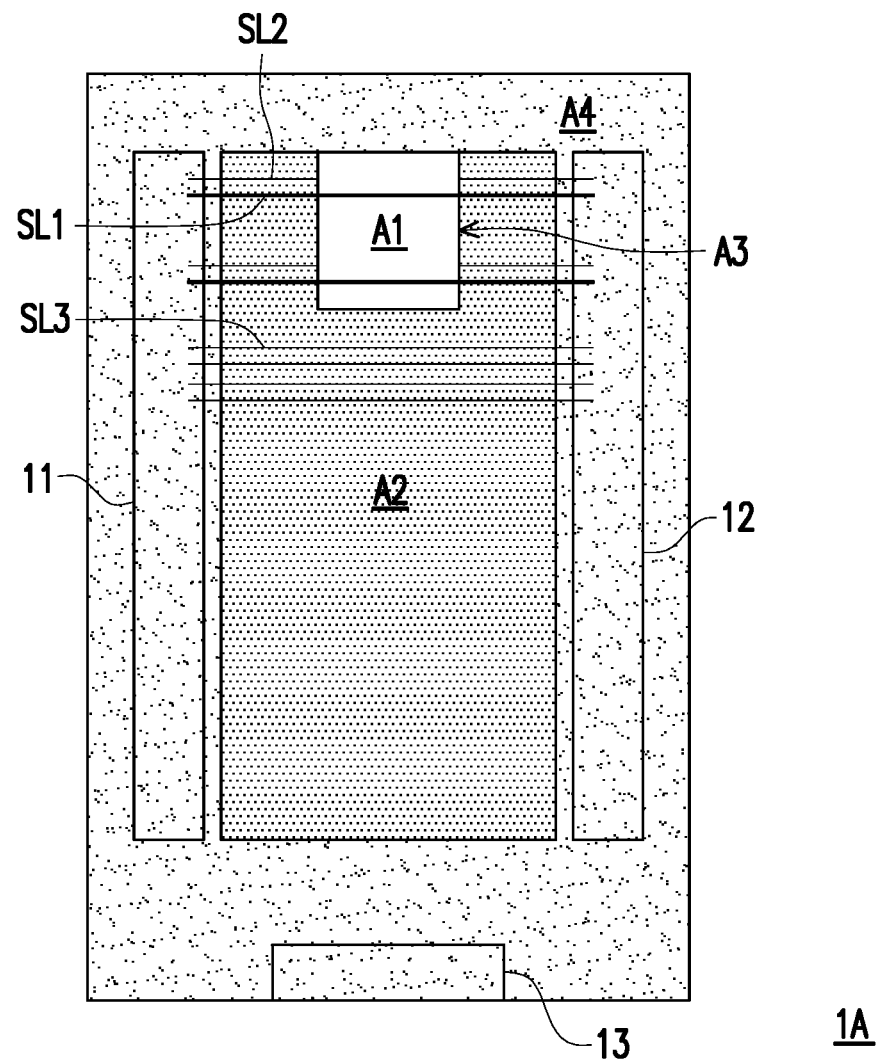
FIG. 2A and FIG. 2B are respectively a schematic top view and a partially enlarged schematic view of a display device according to the second embodiment of the disclosure.
Figure 2B:
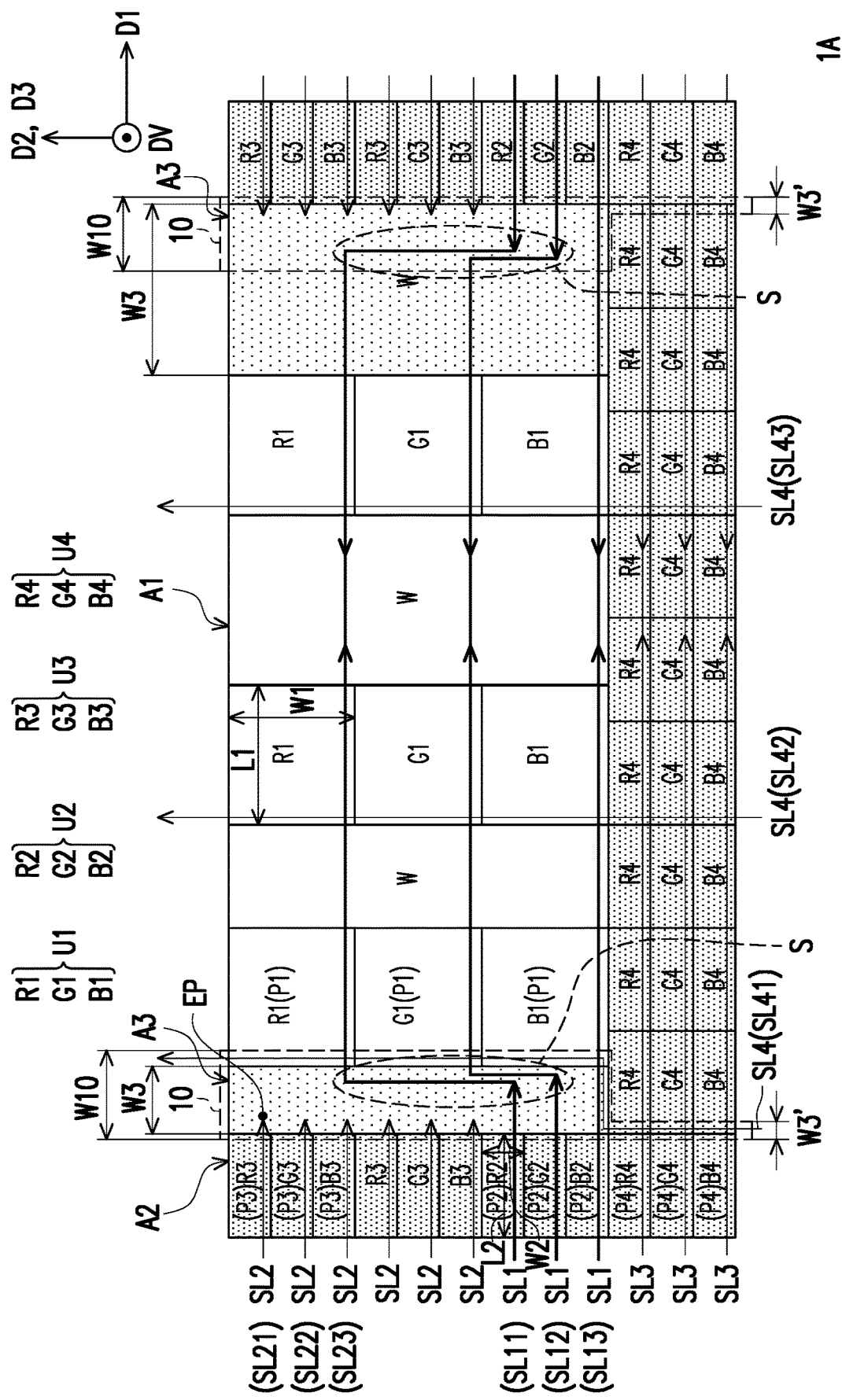

FIG. 2A and FIG. 2B are respectively a schematic top view and a partially enlarged schematic view of a display device according to the second embodiment of the disclosure. Referring to FIG. 2A and FIG. 2B, the main differences between the display device 1A and the display device 1 in FIG. 1A and FIG. 1B are described as follows.

In the display device 1A, the terminal portion EP of the second signal line SL2 is arranged in the third region A3 (refer to the region with dots that are arranged regularly and sparsely in FIG. 2B). In other words, the second signal line SL2 does not extend into the first region A1 (refer to the region without background color in FIG. 2B), that is, the second signal line SL2 does not overlap the first region A1 in the normal direction DV. This design helps to reduce the width W3 of the third region A3, thereby reducing the width W10 of the shielding component 10 in the third region A3 in the first direction D1. Furthermore, this design also helps to reduce the influence of the second signal line SL2 on the aperture ratio of the white sub-pixel W at the boundary of the first region A1, and helps to improve the display quality or enhance the aperture ratio of the first sub-pixel P1 and the white sub-pixel W in the first region A1, thereby increasing the light transmittance of the first region A1.

In FIG. 2B, the arrow to the right represents the gate signal from the first driving circuit 11 of FIG. 2A, and the arrow to the left represents the gate signal from the second driving circuit 12 of FIG. 2A. As shown in FIG. 2B, the gate signals of multiple third pixel units U3 located on the left side and right side of the first region A1 can be provided by the first driving circuit 11 and the second driving circuit 12 of FIG. 2A, respectively. The gate signals of multiple second pixel units U2 located on the left side and right side of the first region A1 and multiple first pixel units U1 located in the first region A1 can be provided jointly by the first driving circuit 11 and the second driving circuit 12 of FIG. 2A. The gate signals of multiple fourth pixel units U4 can be provided jointly by the first driving circuit 11 and the second driving circuit 12 of FIG. 2A. By bidirectionally providing gate signals to multiple sub-pixels located in the first region A1 and the second region A2, it is possible to reduce the number of signal lines that are wound in the third region A3 and decrease the dark lines at the junction, thereby improving the display quality.

Figure 3A:
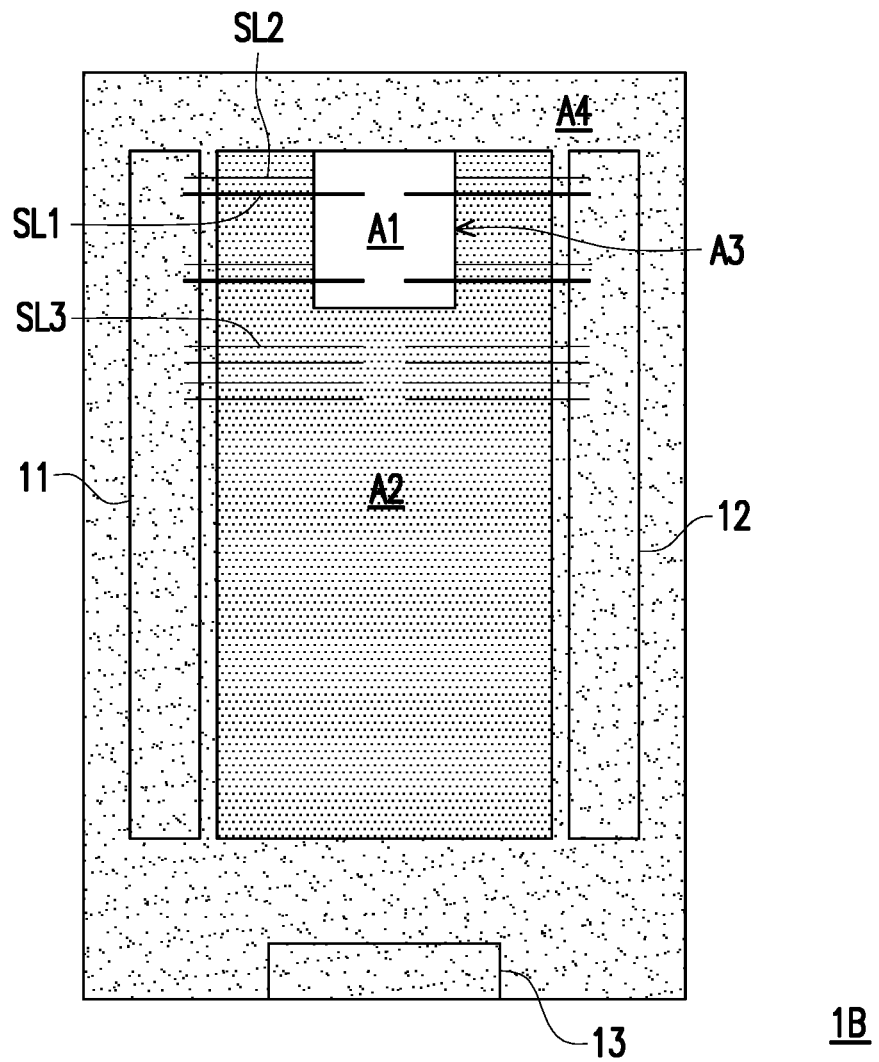
FIG. 3A and FIG. 3B are respectively a schematic top view and a partially enlarged schematic view of a display device according to the third embodiment of the disclosure.
Figure 3B:
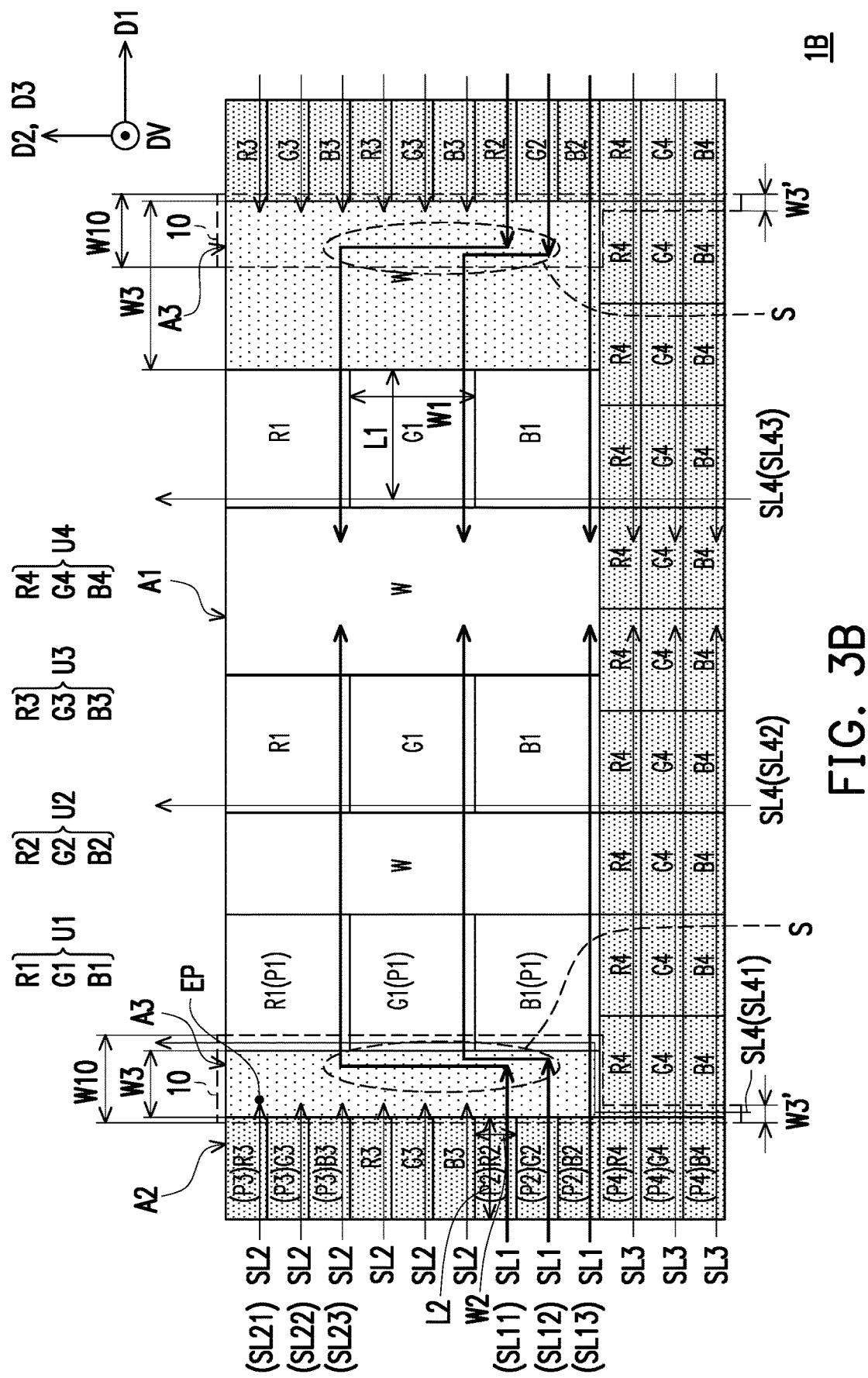

FIG. 3A and FIG. 3B are respectively a schematic top view and a partially enlarged schematic view of a display device according to the third embodiment of the disclosure. Referring to FIG. 3A and FIG. 3B, the main differences between the display device 1B and the display device 1A in FIG. 2A and FIG. 2B are described as follows.

In the display device 1B, multiple first signal lines SL1 are disconnected in the first region A1 (refer to the region without background color in FIG. 3B), and multiple third signal lines SL3 are disconnected in the second region A2 (refer to the region with dots that are arranged regularly and densely in FIG. 3B). The gate signals of the multiple second pixel units U2 located on the left side of the first region A1 and the multiple first pixel units U1 located in the left half of the first region A1 can be provided by the first driving circuit 11 of FIG. 2A. The gate signals of the multiple second pixel units U2 located on the right side of the first region A1 and multiple first pixel units U1 located in the right half of the first region A1 can be provided by the second driving circuit 12 of FIG. 2A. The gate signals of the multiple fourth pixel units U4 located in the left half of the second region A2 can be provided by the first driving circuit 11 of FIG. 2A. The gate signals of the multiple fourth pixel units U4 located in the right half of the second region A2 can be provided by the second driving circuit 12 in FIG. 2A. By bidirectionally providing gate signals to multiple sub-pixels located in the first region A1 and the second region A2, it is possible to solve the problem of uneven gate load, thereby improving the display quality. Moreover, the terminal portion EP of the second signal line SL2 in the display device 1B is arranged in the third region A3, so the number of signal lines that are wound in the third region A3 can be reduced to reduce the dark lines at the junction.

Figure 4:
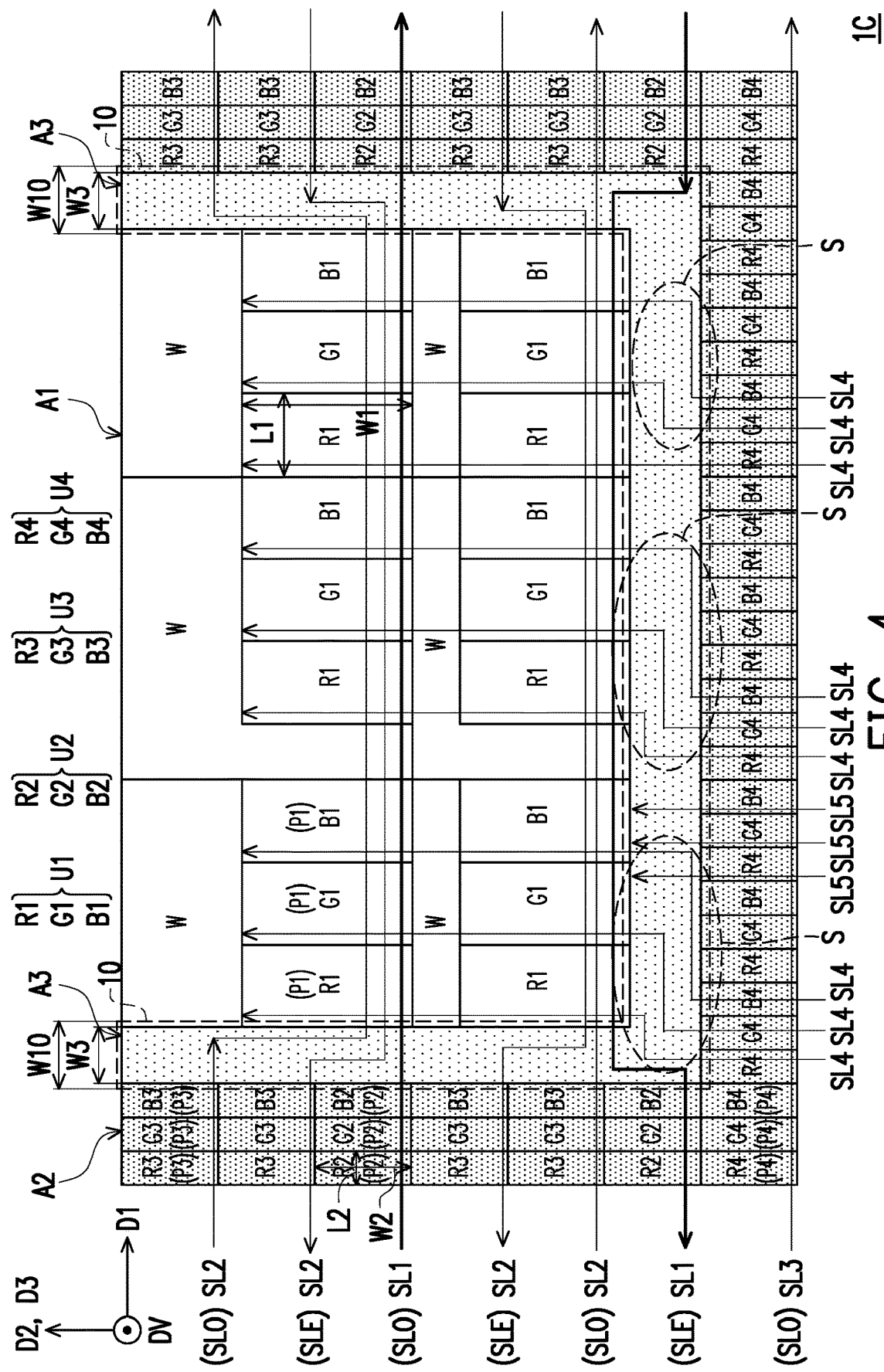
FIG. 4 is a partially enlarged schematic view of a display device according to the fourth embodiment of the disclosure.

FIG. 4 is a partially enlarged schematic view of a display device according to the fourth embodiment of the disclosure. Referring to FIG. 4, the main differences between the display device 1C and the display device 1 in FIG. 1A and FIG. 1B are described as follows.

In the display device 1C, the third region A3 (refer to the region with dots that are arranged regularly and densely in FIG. 4) is located at three sides of the first region A1 (refer to the region without background color in FIG. 4). Multiple sub-pixels of the same color are arranged in the second direction D2, and multiple sub-pixels of different colors are alternately arranged in the first direction D1. Furthermore, the first signal line SL1, the second signal line SL2, and the third signal line SL3 are, for example, gate lines, and the fourth signal line SL4 and the fifth signal line SL5 are, for example, data lines. The first signal line SL1 electrically connects multiple first pixel units U1 located in the first region A1 (refer to the region without background color in FIG. 4) and arranged in the first direction D1 with multiple second pixel units U2 located on the opposite side of the first region A1 and arranged in the first direction D1. The second signal line SL2 electrically connects multiple third pixel units U3 arranged on the opposite side of the first region A1 and arranged in the first direction D1 and is non-electrically connected to the first pixel unit U1. The third signal line SL3 electrically connects multiple fourth pixel units U4 located in the second region A2 (refer to the region with dots that are arranged regularly and densely in FIG. 4) and arranged in the first direction D1. The odd number of signal lines SLO arranged in the second direction D2 are, for example, electrically connected to a driving circuit (not shown) located on the left side of the first region A1 to provide gate signals from the driving circuit to multiple corresponding sub-pixels. The even number of signal lines SLE arranged in the second direction D2 are connected to, for example, a driving circuit (not shown) located on the right side of the first region A1 to provide gate signals from the driving circuit to multiple corresponding sub-pixels. By bidirectionally providing the data signals to multiple sub-pixels located in the first region A1 and the second region A2, the fourth signal line SL4 can have a circuit turn in the third region A3, and the fourth signal line SL4 electrically connects multiple fourth sub-pixels P4 (for example, the red sub-pixel R4) located in the second region A2 and arranged in the second direction D2 with multiple first sub-pixels P1 (for example, red sub-pixel R1) located in the first region A1 and arranged in the second direction D2. The wiring design enables the first sub-pixel P1 in the first region A1 to be written with correct signals, so as to reduce the probability of abnormal images. The terminal portion EP of the fifth signal line SL5 is arranged in the third region A3. In other words, the fifth signal line SL5 does not extend into the first region A1 and does not pass through the first region A1.

Figure 5:
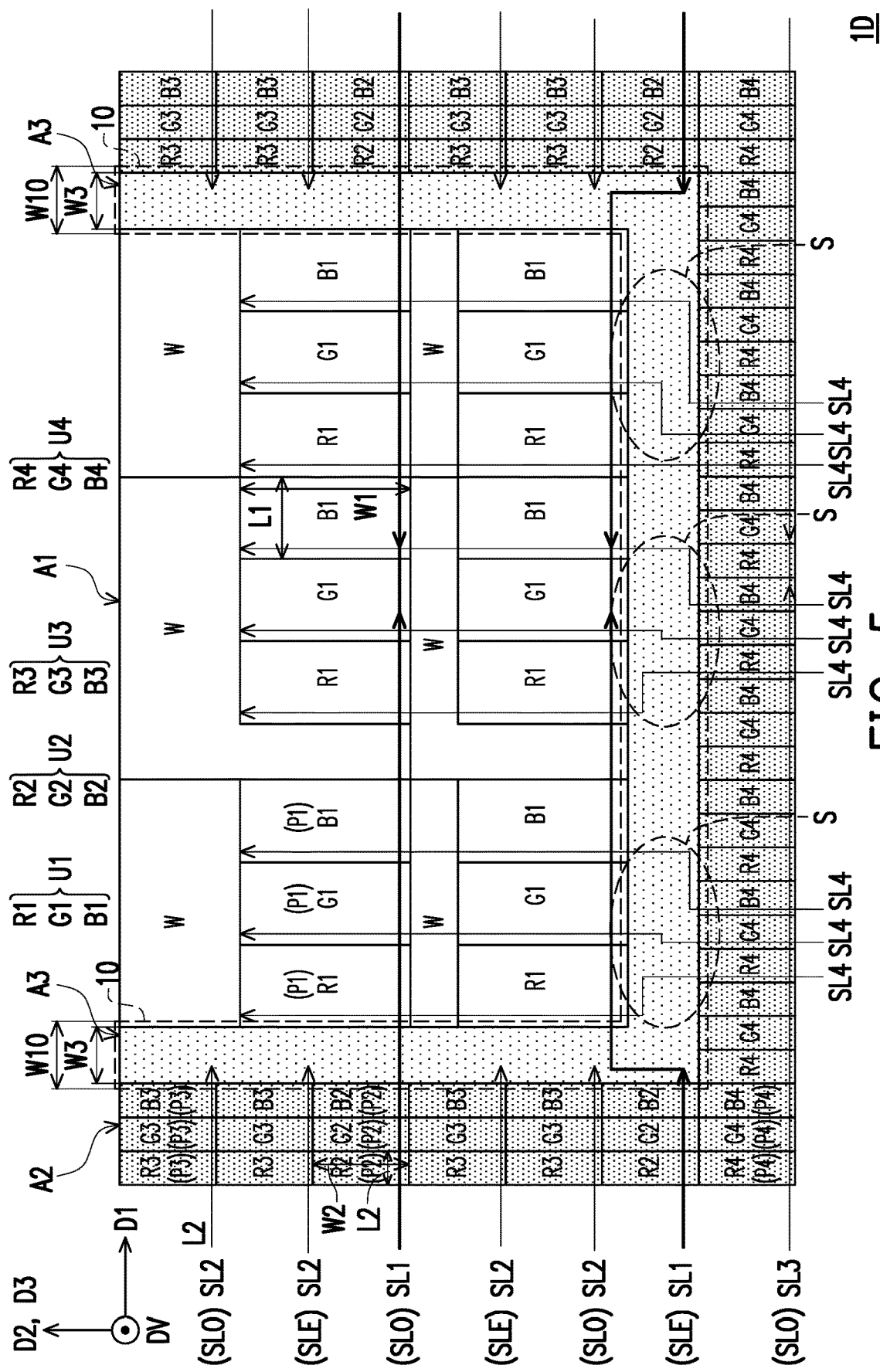
FIG. 5 is a partially enlarged schematic view of a display device according to the fifth embodiment of the disclosure.

FIG. 5 is a partially enlarged schematic view of a display device according to the fifth embodiment of the disclosure. Referring to FIG. 5, the main differences between the display device 1D and the display device 1C in FIG. 4 are explained as follows.

In the display device 1D, the terminal portion EP of the second signal line SL2 is arranged in the third region A3 (refer to the region with dots that are arranged regularly and sparsely in FIG. 5). In other words, the second signal line SL2 does not extend into the first region A1 (refer to the region without the background color in FIG. 5), that is, the second signal line SL2 does not overlap the first region A1 in the normal direction DV. This design helps to reduce the width W3 of the third region A3, thereby reducing the width W10 of the shielding component 10 in the third region A3 in the first direction D1. In addition, this design also helps to reduce the influence of the second signal line SL2 on the aperture ratio of the first region A1, and helps to improve the display quality or enhances the aperture ratio or light transmittance of the pixels in the first region A1.

In FIG. 5, the data signals of multiple third pixel units U3 located on the left side and right side of the first region A1 can be respectively provided by a driving circuit (not shown) on the left side of the first region A1 and a driving circuit (not shown) on the right side of the first region A1. The data signals of the multiple second pixel units U2 located on the left side and right side of the first region A1 and the multiple first pixel units U1 located in the first region A1 can be provided jointly by the driving circuit (not shown) located on the left side of the first region A1 and the driving circuit (not shown) on the right side of the first region A1. The data signals of multiple fourth pixel units U4 can be provided jointly by the driving circuit (not shown) on the left side of the first region A1 and the driving circuit (not shown) on the right side of the first region A1.

In other embodiments, although not shown, multiple first signal lines SL1 can be disconnected in the first region A1 (refer to the region without the background color in FIG. 5), and multiple third signal lines SL3 can be disconnected in the second region A2 (refer to the region with dots that are arranged regularly and densely in FIG. 5), as shown in the embodiment of FIG. 3A. The data signals of the multiple second pixel units U2 located on the left side of the first region A1 and the multiple first pixel units U1 located on the left half of the first region A1 can be provided by a driving circuit (not shown) located on the left side of the first region A1. The data signals of the multiple second pixel units U2 on the right side of the first region A1 and the multiple first pixel units U1 located in the right half of the first region A1 can be provided by a driving circuit (not shown) located on the right side of the first region A1. The data signals of the multiple fourth pixel units U4 located in the left half of the second region A2 can be provided by a driving circuit (not shown) located on the left side of the first region A1, and the data signals of the multiple fourth pixel units U4 located in the right half of the second region A2 can be provided by a driving circuit (not shown) located on the right side of the first region A1. By bidirectionally providing data signals to multiple sub-pixels located in the first region A1 and the second region A2, it is possible to solve the problem of uneven gate load, thereby improving display quality. Moreover, the terminal portion EP of the second signal line SL2 is arranged in the third region A3, so the number of signal lines that are wound in the third region A3 can be reduced to reduce the dark lines at the junction.

Figure 6:
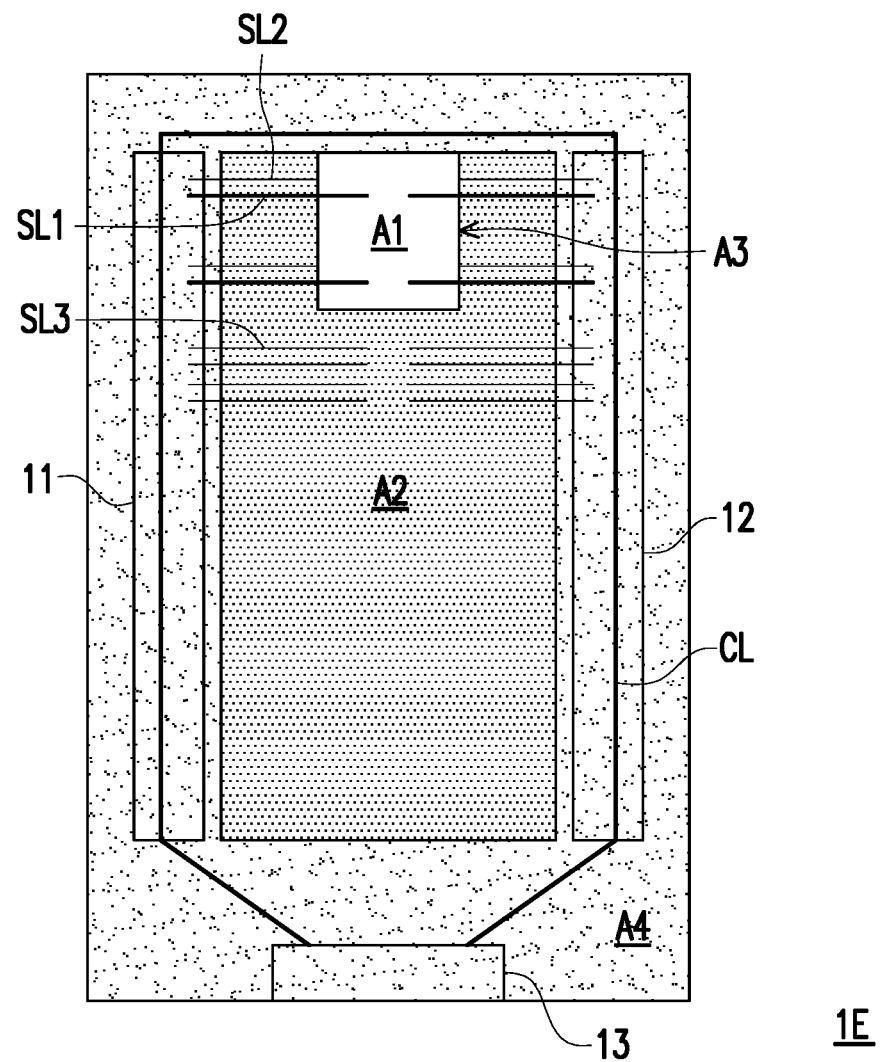
FIG. 6 is a schematic top view of a display device according to the sixth embodiment of the disclosure.

FIG. 6 is a schematic top view of a display device according to the sixth embodiment of the disclosure. Referring to FIG. 6, in the display device 1E, the first driving circuit 11 is disposed on one side of the second region A2, and is electrically connected to a part of the multiple first signal lines SL1, a part of the multiple second signal lines SL2, and a part of the multiple third signal lines SL3. The second driving circuit 12 is disposed on the other side of the second region A2, and is electrically connected to another part of the multiple first signal lines SL1, another part of the multiple second signal lines SL2, and another part of the multiple third signal lines SL3. In addition, the first driving circuit 11 is electrically connected to the second driving circuit 12 through a wire CL. In some embodiments, opposite ends of the wire CL may be electrically connected to the third driving circuit 13. The first driving circuit 11 and the second driving circuit 12 are electrically connected through the wire CL, which can reduce display defects caused by different output signals or voltages differences of the first driving circuit 11 and the second driving circuit 12.

In summary, in the embodiments of the disclosure, the area of the first sub-pixel is larger than the area of the second sub-pixel, which can reduce the effect of diffraction on the camera module set in the first region, thereby improving the imaging quality of the camera module. Moreover, by electrically connecting the second sub-pixel with the corresponding first sub-pixel through the first signal line, the probability of writing wrong voltage can be reduced, and the display quality can be improved. Or, the wiring design of the second signal line can reduce the dark lines at the junction. Alternatively, the bilateral driving method can solve the problem of uneven gate load, thereby improving the display quality.

The above embodiments are only used to illustrate the technical solutions of the disclosure, but not to limit the disclosure. Although the disclosure has been described in detail with reference to the foregoing embodiments, those of ordinary skill in the art should understand that: it is still possible to modify the technical solutions described in the foregoing embodiments, or equivalently replace some or all of the technical features; and these modifications or replacements do not make the essence of the corresponding technical solutions deviate from the technical solutions of the embodiments of the disclosure.

Although the embodiments of the disclosure and their advantages have been disclosed as above, it should be understood that any person skilled in the art, without departing from the spirit and scope of the disclosure, can make changes, substitutions and refinement. In addition, the features of the embodiments can be mixed and replaced at will to form other new embodiments. Moreover, the scope to be protected by the disclosure is not limited to the processes, machines, manufacturing, material composition, devices, methods, and steps in the specific embodiments described in the specification. Any person skilled in the art can understand that, based on the disclosure, the current or future processes, machines, manufacturing, material composition, devices, methods, and steps can be adopted according to the disclosure as long as they can implement substantially the same functions or obtain substantially the same results in the embodiments described herein. Therefore, the scope to be protected by the disclosure includes the above-mentioned processes, machines, manufacturing, material composition, devices, methods, and steps. Furthermore, each claim constitutes an individual embodiment, and the scope to be protected by the disclosure also includes the combination of various claims and embodiments. The scope to be protected by this disclosure shall be defined by the appended claims.

What is claimed is:

1. A display device, having a first region, a second region, and a third region arranged between the first region and the second region, and the display device comprising:
    a substrate;
    a plurality of pixels, disposed on the substrate;
    a first gate line providing a gate signal to a part of the plurality of pixels, and disposed on the substrate, wherein at least a part of the first gate line is disposed in the third region and extends in a first direction, at least another part of the first gate line is disposed in the third region and extends in a second direction, and the first direction is different from the second direction; and
    a second gate line providing another gate signal to another part of the plurality of pixels, and disposed on the substrate, wherein at least a part of the second gate line is disposed in the third region and extends in the first direction, at least another part of the second gate line is disposed in the third region and extends in the second direction;
    wherein the at least another part of the first gate line is overlapped with the at least part of the second gate line.

2. The display device according to claim 1, further comprising:
    a sensing module, disposed in the first region.

3. The display device according to claim 2, wherein the sensing module has a function of photographing.

4. The display device according to claim 2, wherein the sensing module is a camera module.

5. The display device according to claim 2, wherein the plurality of pixels comprise a first sub-pixel, the sensing module is under the first sub-pixel arranged in the first region.

6. The display device according to claim 5, wherein the sensing module partially overlaps the first sub-pixel.

7. The display device according to claim 1, wherein the plurality of pixels comprise a first sub-pixel and a second sub-pixel, the first sub-pixel is arranged in the first region, the second sub-pixel is arranged in the second region, and a first area of the first sub-pixel is larger than a second area of the second sub-pixel.

8. The display device according to claim 7, wherein a first color of the first sub-pixel is different from a second color of the second sub-pixel.

9. The display device according to claim 7, wherein the first sub-pixel and the second sub-pixel are arranged in the first direction, and the at least another part of the first gate line is located between the first sub-pixel and the second sub-pixel.

10. The display device according to claim 1, further comprising:
    a shielding component, at least partially overlapped with the at least another part of the first gate line and the at least part of the second gate line.

* * * * *